United States Patent [19]
Robinson

[11] 3,962,523
[45] June 8, 1976

[54] VITREOUS COATING COMPOSITION

[75] Inventor: Ian George Robinson, Noble Park, Australia

[73] Assignee: Blythe Colours (Australia) Proprietary Limited, East Brighton, Australia

[22] Filed: Apr. 13, 1972

[21] Appl. No.: 243,846

[30] Foreign Application Priority Data
July 9, 1970  Australia............................ 1774/70

[52] U.S. Cl.................................. 428/426; 106/48; 252/471; 252/449; 428/432
[51] Int. Cl.² ..................... B32B 17/06; C03C 7/04; C03C 5/00
[58] Field of Search............ 106/48 C; 117/129, 97; 252/471

[56] References Cited
UNITED STATES PATENTS

| | | | |
|---|---|---|---|
| 2,642,364 | 6/1953 | Beatty et al............................ | 106/48 |
| 3,278,324 | 10/1966 | Nelson................................... | 106/48 |
| 3,509,041 | 4/1970 | Miale..................................... | 106/48 |
| 3,580,733 | 5/1971 | Ott......................................... | 106/48 |
| 3,587,556 | 6/1971 | Moreland.............................. | 106/48 |
| 3,718,498 | 2/1973 | Denny.................................... | 106/48 |
| 3,791,995 | 2/1974 | Clay....................................... | 106/48 |

FOREIGN PATENTS OR APPLICATIONS

| | | | |
|---|---|---|---|
| 1,197,067 | 7/1970 | United Kingdom................... | 106/48 |

*Primary Examiner*—Winston A. Douglas
*Assistant Examiner*—Mark Bell
*Attorney, Agent, or Firm*—Ladas, Parry, Von Gehr, Goldsmith & Deschamps

[57] ABSTRACT

The invention is directed to a process for producing a vitreous coating composition of the type comprising a vitreous bonding flux or frit and an oxidation inducing agent, the composition being capable, after the addition of suitable adjuncts and firing, of enhancing the oxidation of organic soils deposited thereon at temperatures in the range 300° to 550°F and includes the steps of smelting the vitreous frit-producing raw materials in the absence of the oxidation inducing agent, quenching the smelted materials to produce the frit, and incorporating with the frit the oxidation inducing agent in the form of a silicate bearing ore containing an oxide of a metal selected from the group consisting of nickel, cobalt, manganese, copper, chromium, iron and aluminium.

4 Claims, No Drawings

VITREOUS COATING COMPOSITION

This invention relates to a vitreous coating composition of the type comprising a vitreous bonding flux or frit (hereinafter also referred to as "frit") and an oxidation inducing agent, said composition being capable, after the addition of suitable adjuncts and firing, of enhancing the oxidation of organic soils deposited thereon at temperatures in the range 300° – 550°F, and to a method for producing said composition.

The above compositions find specific use, inter alia, as coatings on oven liners for the purpose of oxidizing organic soils commonly spattered thereon during oven use at normal oven operating temperatures.

The background and theory underlying this invention has been adequately described for example in U.S. patent application Ser. No. 715,186, filed Mar. 22, 1968, assigned to Ferro Corporation which discloses one type of the aforementioned compositions wherein the oxidation inducing agent is homogeneously fritted into the vitreous composition by smelting the oxidation inducing agent into the vitreous bonding frit followed by quenching of the smelt. The resultant frit containing the oxidation inducing agent is then milled with suitable adjuncts commonly used in the art, followed by firing the composition onto an appropriate substrate, (e.g. oven liner).

It will be appreciated that the smelting of the oxidation inducing agent into the frit is essential to the invention of the above application as it is an object of that invention to obtain a vitreous composition wherein the oxidation inducing agent is homogeneously fritted.

However, because the oxidation inducing agent, in accordance with the aforementioned method, must be present during the smelting of the frit-forming raw materials, the smelting and quenching of the mixture is necessarily subject to considerable production problems resulting in increased production costs.

Again, on account of the necessary presence of the oxidation inducing agent in the frit smelt, the aforementioned method suffers from a further disadvantage, this being the lack of flexibility in producing a final composition having a required firing range. It is a well known fact that different oven manufacturers, for example, use different firing temperature ranges for firing or sintering the applied coating compositions and it is thus advantageous to be able to provide coating compositions having the required firing characteristics. The prior art method is not suitable for varying the firing range of the coating compositions as the composition of the homogeneous frit and its firing characteristics is fixed between narrow limits of temperature; therefore, the latter cannot thus be directly and easily varied by varying the proportion of components prior to smelting.

The oxidation inducing agents used in the prior art, as is for instance evident from the disclosures of the aforementioned U.S. patent application Ser. No. 715,186, are selected from the oxides of the metals nickel, cobalt, manganese, copper, chromium, iron and aluminium.

The use of these oxides in their free form has presented considerable problems to the prior art in view of the tendency of these free oxides to pass readily into solution in the frit at temperatures within the normal firing range used by appliance manufactures, i.e. 1400° – 1600°F. Accordingly, it has been proposed to reduce the firing characteristics or temperature of the coating compositions to a temperature well below the range 1400° – 1600°F and thus to prevent substantial solution of the oxidation inducing agent in the frit. Unfortunately, this lowering of the firing temperature is accompanied by a corresponding reduction in the abrasion resistance of the enamel, this being obviously undesirable as it shortens the life of the enamel. Thus, in U.K. Patent No. 1,227,838, it is proposed to overcome the above problems of the solution of the oxidation inducing agent in the frit by producing a final composition having a very low firing temperature (i.e. 1000° – 1100°F) thus reducing the chance of excessive solution of the oxidation inducing agent in the frit by retaining some sort of abrasion resistance which is, however, still unsatisfactory.

Furthermore, the above firing temperature range does not fall within the range of firing temperatures commonly used by appliance manufacturers (i.e. 1400° – 1600°F).

It is thus the principal object of the present invention to provide an improved method for producing a vitreous coating composition of the type defined herein, which method is characterised by
  1. greater simplicity and economy,
  2. flexibility in providing coating compositions to suit various firing ranges used by appliance manufacturers, and
  3. achievement of a coating composition wherein the oxidation inducing agent will not as readily pass into solution in the surrounding frit, relative to the methods used hitherto.

It is another object of the invention to provide a vitreous coating composition having, after firing, improved abrasion resistance while being at least as effective in its oxidation enhancing properties as the known compositions.

With the above objects in mind, it has now surprisingly been discovered that by carrying out the smelting of the frit-forming raw materials in the absence of the oxidation inducing agent and adding the latter, in the form of a silicate bearing ore containing an oxide of the metals as hereinbefore enumerated, to the frit, there is obtained a final vitreous composition having greater abrasion resistance and yet comparable oxidation enhancing characteristics in relation to the known compositions.

The invention thus provides a process for producing a vitreous coating composition of the type herein defined comprising smelting the vitreous frit-producing raw materials in the absence of the oxidation inducing agent, quenching the smelted materials to produce the frit, and incorporating in the frit the oxidation inducing agent in the form of a silicate bearing ore containing an oxide of a metal selected from the group consisting of nickel, cobalt, manganese, copper, chromium, iron and aluminium.

The invention also provides a vitreous coating composition of the type herein defined, comprising a fine granular mixture of a vitreous frit and an oxidation inducing agent in the form of a silicate bearing ore containing an oxide of a metal selected from the group consisting of nickel, cobalt, manganese, copper, chromium, iron and aluminium.

It will be understood that a fine granular mixture is a granular mixture having a grain size in the range 100–200 mesh.

The invention further provides a vitreous enamel coating comprising a vitreous frit and an oxidation inducing agent in the form of a silicate bearing ore containing an oxide of a metal selected from the group consisting of nickel, cobalt, manganese, copper, chromium, iron and aluminium, said oxidation inducing agent being heterogeneously dispersed in, and sintered by, said frit.

The silicate bearing ore characterising the compositions of this invention are preferably selected from the group consisting of Braunite ($3MnO_3 . MnSiO_3$), Rhodonite ($MnSiO_3$ or $MnOSiO_2$), Tephroite ($Mn_2SiO_4$) and Alleghanyite ($5MnO . 2SiO_2$). Other silicate bearing ores which can be used in accordance with the present invention are, for example, Spessartite [$(Mn_3Al_2 (SiO_4)_3$] and Sobralite [$(MnFeCaMg) SiO_3$].

Generally, the proportions of oxidation inducing agent to frit vary between 90:10 to 60:40 parts by weight and the proportion of oxidation inducing agent in the final coating composition (or enamel) is in the range 30 to 50% by weight.

As is well known in the art, there is usually added to the mixture of frit and oxidation inducing agent, and cominuted therewith, one or more of the following materials:

(a) binder,
(b) colouring agent,
(c) electrolyte, the resultant mixture being applied to the substrate as an aqueous suspension.

The binder used for bonding the vitreous composition to the substrate before firing may either be organic or inorganic or a mixture of these.

Any colouring agent which is compatible with the vitreous composition and which will confer the desired colour on the resultant enamel can be used. Conveniently, the invention uses a black colouring agent.

Any electrolyte may be used in the composition and this may preferably be sodium nirite.

The vitreous bonding frit used in the invention may be constituted by a variety of materials in various proportions, such compositions being well known in the art. The frit is basically an alkali boro-silicate and is, as mentioned herein above, produced by the smelting and quenching of a batch of raw materials containing, inter alia, silica. The nature and proportions of these raw materials is again well known in the art.

In practice, the frit, oxidation inducing agent, binder and colouring agent, if any, are mixed in appropriate proportions and comminuted, for example by milling the materials, and the resultant composition is supplied to the appliance (e.g. oven) manufacturer with instructions to add appropriate quantities of water and optionally, organic binder and electrolyte. The resultant aqueous composition is then applied by spraying, dipping, or by other means, to the appropriate substrate (e.g. oven liner), followed by firing (sintering) of the composition at a temperature in the range 1400° to 1600°F.

While the above method is considerably more simple and economical than those presently known, the method also results in a vitreous coating composition having (when fired) greater abrasion resistance and at least the same oxidation en-hancing properties as the composition produced in accordance with the methods of the prior art.

Also, by introducing the oxidation inducing agent into the frit, and not into the mixture of frit-producing raw materials prior to smelting, a greater flexibility is retained for altering the firing characteristics of the final composition. It is known that the firing temperature is directly dependent on the amount of oxidation inducing agent present in the final composition and thus by simply increasing or decreasing the proportion of oxidation inducing agent in the composition, by addition thereof to the frit, the firing temperature may be increased or decreased respectively. Thus the extreme ratios of oxidation inducing agent to frit quoted hereinabove are approximately equivalent to a firing range within the limits 1600°F to 1400°F.

Furthermore, the use of a silicate bearing ore as defined hereinabove ensures that the oxidation inducing agent does not pass into solution in the surrounding frit at the usual firing temperatures employed by appliance manufacturers (i.e. 1400° to 1600°F) with the consequent loss of oxidising capacity. Thus, the use of the above ore as the oxidation inducing agent will ensure the retention of the oxidising properties of the enamel coating as well as an adequate abrasion resistance due to the fact that the firing temperature need not be lowered to prevent solution of the agent in the frit.

It will furthermore be appreciated that the use of the silicate bearing ores is more economical than that of the oxides heretofore used.

EXAMPLE 60 to 80 parts of Rhodonite ($MnSiO_3$ or $MnOSiO_2$ having a silica content of 45.9% and a manganese protoxide content of 54.1%) is dry ground with 40 to 20 parts of a frit produced from a batch of frit-producing raw materials having the following composition:

|       |                   |            |         |
|-------|-------------------|------------|---------|
|       | Borax (Anhydrous) | 27.5 parts | (22.7%) |
|       | Silica            | 35.0 parts | (28.1%) |
| (Pot) | Felspar           | 39.5 parts | (32.0%) |
|       | Soda Ash          | 8.8 parts  | (7.2%)  |
|       | Fluorspar         | 5.5 parts  | (4.5%)  |
|       | Soda Nitrate      | 3.3 parts  | (2.7%)  |
|       | Cobalt Oxide      | 2.0 parts  | (1.4%)  |
|       | Nickel Oxide      | 1.0 part   | (0.8%)  |
|       | Manganese Dioxide | .8 part    | (0.6%)  |

(All percentages above are percentages on a weight basis).

To 100 parts of this mixture there are added 1 part of Ball Clay, 0.50 part of Bentonite, 5 parts of a black stain and 0.25 part of sodium nitrite, and the whole mixture is dry ground to approximately 80 mesh. 38 parts of water and 2 parts of organic binder are then added and the mixture is then wet ground to 1 gram residue from a 50 cc sample washed through a 200 mesh sieve.

The resultant aqueous mixture was then sprayed on a suitably prepared substrate and the composition was then fired (sintered) at a temperature in the range 1400° to 1600°F.

I claim:

1. A composition adapted to be sintered on a substrate to form a vitreous enamel coating capable of enhancing oxidation of organic soils deposited thereon in the range of 300° F. to 550°F., consisting essentially of a comminuted mixture of previously smelted and quenched frit-producing material, and a separate oxidation inducing agent in the form of a silicate bearing ore selected from the group consisting of Rhodonite ($MnSiO_3$), Tephroite $MnSiO_4$), Alleghanyite ($5MnO_2 . 2SiO_2$), Spessartite [$Mn_3Al_2(SiO_4)_3$] and Sobralite

[(MnFeCaMg)SiO$_3$] in which the proportion of oxidation inducing agent to frit in the comminuted mixture is in the range of 90:10 to 60:40 by weight.

2. A composition according to claim 1 in which a sufficient quantity of silicate bearing ore is added such that the quantity of oxidation inducing agent in the final vitreous coating is from 30 to 50% by weight.

3. The combination of a single vitreous enamel coating adhered to a substrate, said coating being capable of enhancing oxidation of organic soils deposited thereon in the range of 300°F. to 550°F. consisting essentially of a sintered comminuted mixture of previously smelted and quenched frit-producing material, and a separate oxidation inducing agent in the form of a silicate bearing ore selected from the group consisting of Braunite (3Mn$_2$O$_3$ . MnSiO$_3$), Tephroite (MnSiO$_4$), Alleghanyite (5MnO$_2$ . 2SiO$_2$), Spessartite [Mn$_3$Al$_2$(SiO$_4$)$_3$] and Sobralite [(MnFeCaMg)SiO$_3$] in which the proportion of oxidation inducing agent to frit in the sintered comminuted mixture is in the range of 90:10 to 60:40 by weight.

4. The combination according to claim 3 in which the quantity of oxidation inducing agent in the sintered comminuted mixture is from 30 to 50% by weight.

* * * * *

UNITED STATES PATENT AND TRADEMARK OFFICE
CERTIFICATE OF CORRECTION

PATENT NO. : 3,962,523
DATED : June 8, 1976
INVENTOR(S) : Ian George Robinson

It is certified that error appears in the above—identified patent and that said Letters Patent are hereby corrected as shown below:

On the cover sheet, the Foreign Application Priority Data should be omitted.

Signed and Sealed this

Twenty-fourth Day of August 1976

[SEAL]

Attest:

RUTH C. MASON
Attesting Officer

C. MARSHALL DANN
Commissioner of Patents and Trademarks